US012098828B1

(12) United States Patent
Irons et al.

(10) Patent No.: US 12,098,828 B1
(45) Date of Patent: Sep. 24, 2024

(54) ROTATING BRACKET FOR LINEAR LIGHTING

(71) Applicant: Elemental LED, Inc., Reno, NV (US)

(72) Inventors: Travis Irons, Reno, NV (US); Robert Green, Reno, NV (US); Vera Sophia Summerhill, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 18/310,868

(22) Filed: May 2, 2023

(51) Int. Cl.

*F21V 21/30* (2006.01)
*F21K 9/272* (2016.01)
*F21S 4/20* (2016.01)
*F21V 15/015* (2006.01)
*F21V 19/00* (2006.01)
*F21V 21/096* (2006.01)
*F21Y 103/10* (2016.01)

(52) U.S. Cl.

CPC .............. *F21V 21/30* (2013.01); *F21K 9/272* (2016.08); *F21S 4/20* (2016.01); *F21V 15/015* (2013.01); *F21V 21/096* (2013.01); *F21V 19/00* (2013.01); *F21Y 2103/10* (2016.08)

(58) Field of Classification Search

CPC ...... F21V 15/015; F21V 17/005; F21V 19/00; F21K 9/272; F21S 4/20

See application file for complete search history.

(56) References Cited

U.S. PATENT DOCUMENTS 5,906,427 A * 5/1999 Noh .......................... F21S 4/20 362/221
9,279,544 B1 3/2016 Dankelmann et al.
10,788,170 B1 9/2020 Bryan
10,982,839 B1 * 4/2021 Yang ........................ F21V 15/01
2018/0274851 A1 * 9/2018 Norris ................... F25D 27/005
2022/0228723 A1 7/2022 Bryan

OTHER PUBLICATIONS

Elemental LED, Inc., "DIODE LED: SQUARE Channel (Components): MOUNTING—Rotating Clip." Internet. Available at https://www.diodeled.com/chromapath-builder-accessory-square.html. Last visited May 2, 2023.

* cited by examiner

*Primary Examiner* — William N Harris
(74) *Attorney, Agent, or Firm* — Andrew McAleavey

(57) ABSTRACT

A rotating bracket includes an endcap, a fastener, a support, a spacer, and securement structure. The endcap is adapted to fit an end of a linear lighting channel and has a keyed opening. The fastener has a keyed shank complementary to the keyed opening of the endcap and is adapted to be inserted into the endcap with the keyed shank of the fastener engaging the keyed opening of the endcap. The support has a slot or opening adapted to accommodate the fastener. The spacer is adapted to insert over the fastener such that it is positioned between the endcap and an inner face of the support. The securement structure engages the end of the fastener beyond an outer face of the support. Linear luminaires using the rotating bracket are also disclosed.

16 Claims, 7 Drawing Sheets

ROTATING BRACKET FOR LINEAR LIGHTING

TECHNICAL FIELD

The invention relates to a rotating bracket for linear lighting.

BACKGROUND

Lighting based on light-emitting diodes (LEDs) has replaced many legacy incandescent and fluorescent light sources in homes, offices, and other settings. In general, LED light sources are more energy efficient than legacy sources, offer better-quality light in a greater variety of color temperatures, and can go places and do things that legacy light sources cannot.

One of the most common forms of LED-based lighting is the linear luminaire. Typically, a linear luminaire comprises a long channel with a constant cross-section, covered by a translucent cover. In many cases, the channel cover is configured as a diffuser, a lens, or some other structure that modifies the light emitted from the luminaire. Within the channel lies an LED light source, usually a strip of linear lighting, which includes a number of LED light engines spaced from one another at a regular pitch along a printed circuit board. Basic examples of these sorts of luminaires are shown in U.S. Pat. No. 9,279,544. A basic linear luminaire may emit light with a beam width on the order of about 120-150°.

More advanced linear luminaires have also been described and are available. For example, U.S. Pat. No. 10,788,170 describes a linear luminaire that uses a two-element optical system to produce highly-focused light. A luminaire according to this patent may have a beam width of, e.g., 10°, measured full-width, half-maximum. U.S. Patent Application Publication No. 2022/0228723 describes a variation on this concept: a linear luminaire with a faceted optic designed to throw light asymmetrically, focusing the emitted light away from the centerline of the luminaire.

Linear luminaires are sometimes mounted on rotating brackets, which give installers and users additional means for directing the emitted light. These brackets may be especially useful with linear luminaires that produce a narrow, focused beam, because the installer or user can rotate the luminaire to throw the emitted light exactly where it is needed or desired. However, the typical rotating bracket has significant disadvantages. Designed to attach entirely to the exterior of a linear luminaire, a typical rotating bracket is a high-profile element, sometimes several inches in height. (By contrast, a linear luminaire itself may have a height of 1 inch (2.54 cm) or less in many cases.) The height of the typical rotating bracket makes it unsuitable for many types of installations.

BRIEF SUMMARY

One aspect of the invention relates to a rotating bracket. The rotating bracket comprises an endcap, a fastener, a support, a spacer, and securement structure. The endcap is adapted to fit an end of a linear lighting channel, and has a keyed opening. The fastener has a keyed shank complementary to the keyed opening of the endcap and is adapted to be inserted into the endcap with the keyed shank of the fastener engaging the keyed opening of the endcap. The support has a slot or opening adapted to accommodate the fastener. The spacer is adapted to insert over the fastener such that it is positioned between the endcap and an inner face of the support. The securement structure engages the end of the fastener beyond an outer face of the support.

The fastener may include a head, the keyed shank, and a shaft beyond the shank. The fastener is inserted such that the head of the fastener bears against an inner face of the endcap. The inner face of the endcap may define a recess into which the head of the fastener fits, such that the head of the fastener is flush with the inner face of the endcap. The spacer may include a keyed opening that inserts over the fastener and engages the keyed shank of the fastener. The fastener may comprise a bolt and the securement structure a nut.

Another aspect of the invention relates to a linear luminaire. The linear luminaire comprises a channel, at least one strip of linear lighting in the channel and, at each end of the channel, a rotating bracket as described above.

Yet another aspect of the invention also relates to a linear luminaire. The linear luminaire comprises a channel having a slot, a strip of linear lighting in the channel, one or more permanent magnets mounted in association with the slot of the channel, and a ferromagnetic base shaped to allow the channel to pivot in the base. For example, the ferromagnetic base may have a curved bearing surface. The one or more permanent magnets may be mounted in the slot of the channel or carried by a bracket with a first portion that is adapted to be secured in the slot of the channel.

Other aspects, features, and advantages of embodiments of the invention will be set forth in the following description.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
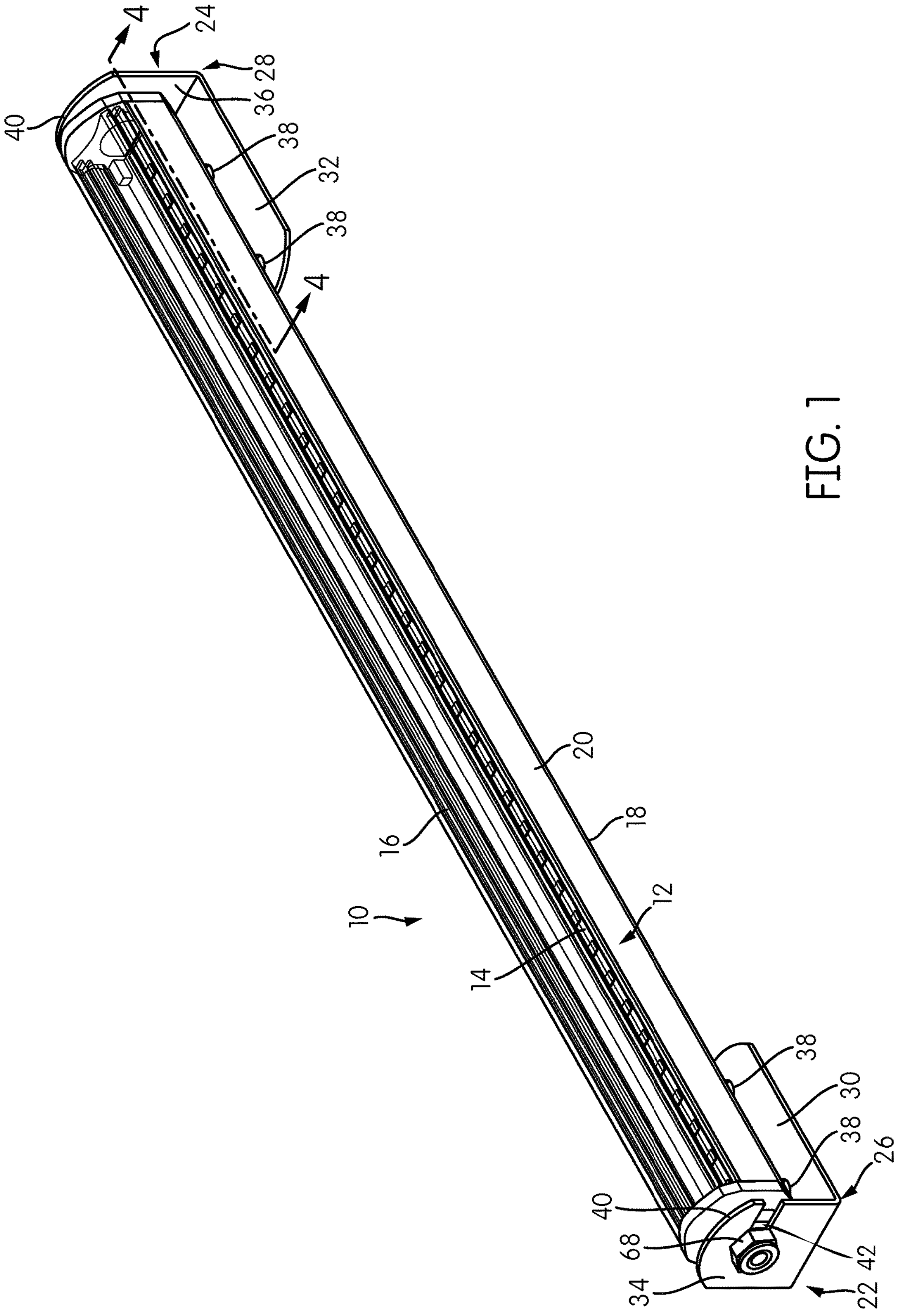
FIG. 1 is a perspective view of a linear luminaire mounted on rotating brackets, according to one embodiment of the invention.

FIG. 1 is a perspective view of a linear luminaire, generally indicated at 10, according to one embodiment of the invention. The linear luminaire 10 includes a channel 12, a strip of linear lighting 14 installed within the channel 12, and a cover 16. In the illustrated embodiment, the cover 16 is a lens and a part of the kind of multi-element optical system disclosed in U.S. Pat. No. 10,788,170. However, the details of the optical system are not critical, and the cover 16 may be any sort of cover, including a clear cover or a light-diffusing cover.

The channel 12 typically has the same shape over its entire length. In the illustrated embodiment, the channel 12 is an extrusion and may be made of, e.g., a metal, such as aluminum, or a plastic, such as polycarbonate. A metal channel may be anodized, painted, powder coated, or otherwise surface-treated. The advantage of extrusion is that a long article with a constant cross-section can be easily made with simple tooling. However, channels according to embodiments of the invention may be cast, injection molded, made from sheet metal, or constructed in any number of other ways.

Here, the channel 12 has the shape and features of the channel disclosed in U.S. Pat. No. 10,788,170, but many shapes and variations are possible. The compartment in which the strip of linear lighting 14 is installed is U- or cup-shaped, with a bottom 18 and sidewalls 20 that arise from either side of the bottom. The strip of linear lighting 14 is installed on the bottom 18 in FIG. 1, although in some cases, it may be installed on one of the sidewalls 20. (Placing the strip of linear lighting 14 on one of the sidewalls 20 and thereby reflecting the emitted light from the bottom 18 and the other sidewall 20 is a technique that can be used to diffuse the emitted light.) The channel 12 may have other compartments, a raceway for wiring, or other such elements.

More particularly, the arrangement of U.S. Pat. No. 10,788,170 is shown in the figures because that patent discloses linear luminaires that direct the light from a strip of linear lighting into a narrow beam. While embodiments of the invention are applicable to any sort of linear luminaire and any sort of linear lighting, linear luminaires that focus or direct the light in a particular way may derive the most benefit from rotating brackets.

Figure 2:
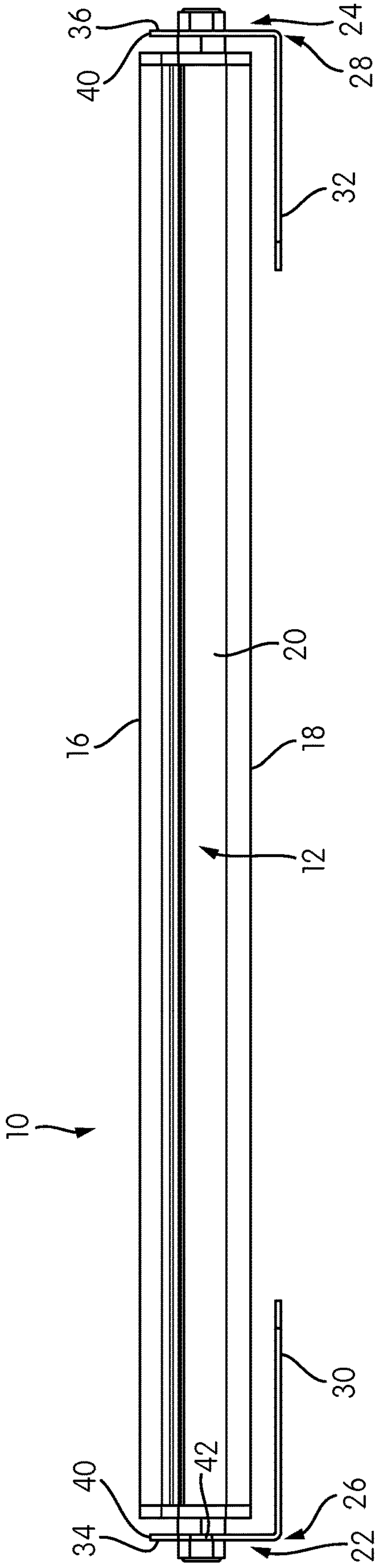
FIG. 2 is a front elevational view of the linear luminaire.
Figure 3:
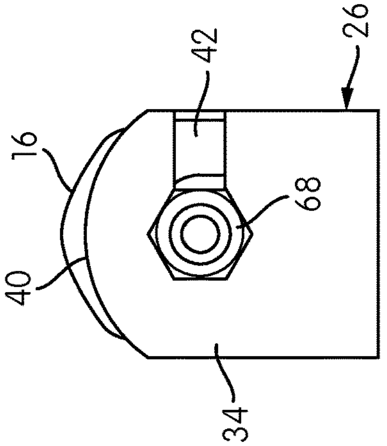
FIG. 3 is an end elevational view of the linear luminaire.

FIG. 2 is a front elevational view of the linear luminaire 10, and FIG. 3 is an elevational view of one end of the linear luminaire 10. As shown in the figures, each end of the channel 12 is supported by a rotating bracket assembly, generally indicated at 22 and 24. Each rotating bracket assembly 22, 24 comprises an L-shaped bracket 26, 28 that defines a base 30, 32 and an upright 34, 36. The bases 30, 32 of the brackets 26, 28 are configured and adapted to attach the brackets 26, 28 to an external surface to provide support for the linear luminaire 10. In the illustrated embodiment, each base 30, 32 has two openings 38 (best seen in FIG. 1) that are spaced from one another and adapted to receive fasteners, such as screws, nails, etc. The bases 30, 32 of the brackets 26, 28 are thus identical in the illustrated embodiment, although that need not be the case in all embodiments. The structure of the bases 30, 32 will depend on the structures to which they are adapted to attach. For example, in another embodiment, one base may have openings while the other may have slots. In some embodiments, one base may have slots oriented in a first direction while the other base may have slots oriented in a second direction. In yet other embodiments, the bases 30, 32 may slide into complementary receiving structures provided on the surface to which they are to attach. If mechanical fasteners are undesirable for a particular application, the bases 30, 32 could, for example, have adhesive pads on them.

In the illustrated embodiment, the uprights 34, 36 of the brackets 26, 28 are shorter than the bases 30, 32. Generally speaking, the uprights 34, 36 are just tall enough to provide sufficient rotational clearance for the channel 12 and, if necessary, to secure fasteners in the openings 38, 38 of the bases 30, 32. As can be seen particularly in the end-elevational view of FIG. 3, the cover 16 protrudes vertically just over the top edge 40 of the upright 34. The vertical extent of the cover 16 relative to the upright 34 will differ from embodiment to embodiment. In some cases, the cover 16 may terminate level with or below the top edge 40 of the upright 34. The top edge 40 has a radius of curvature in the illustrated embodiment; in other embodiments, it may be squared. The radius of curvature of the top edge 40 may also match the curvature of the cover 16 in some cases.

As can be seen particularly in FIGS. 1 and 3, each upright 34, 36 includes structure to receive and support the channel 12. The upright 34 shown in FIG. 3 has a slot 42 that extends from one lateral edge of the upright 34 to its center. The upright 36 of the other bracket 24 may have similar or different structure. In general, the structures 42 on the respective uprights 34, 36 are positioned such that when the brackets 26, 28 are aligned with one another, the structures on them will be aligned with one another. In this embodiment, for example, the upright 36 has an opening, instead of a slot 42. The opening (not shown in the figures) is centered on the upright 36 at a vertical position aligned with the slot 42.

Figure 4:
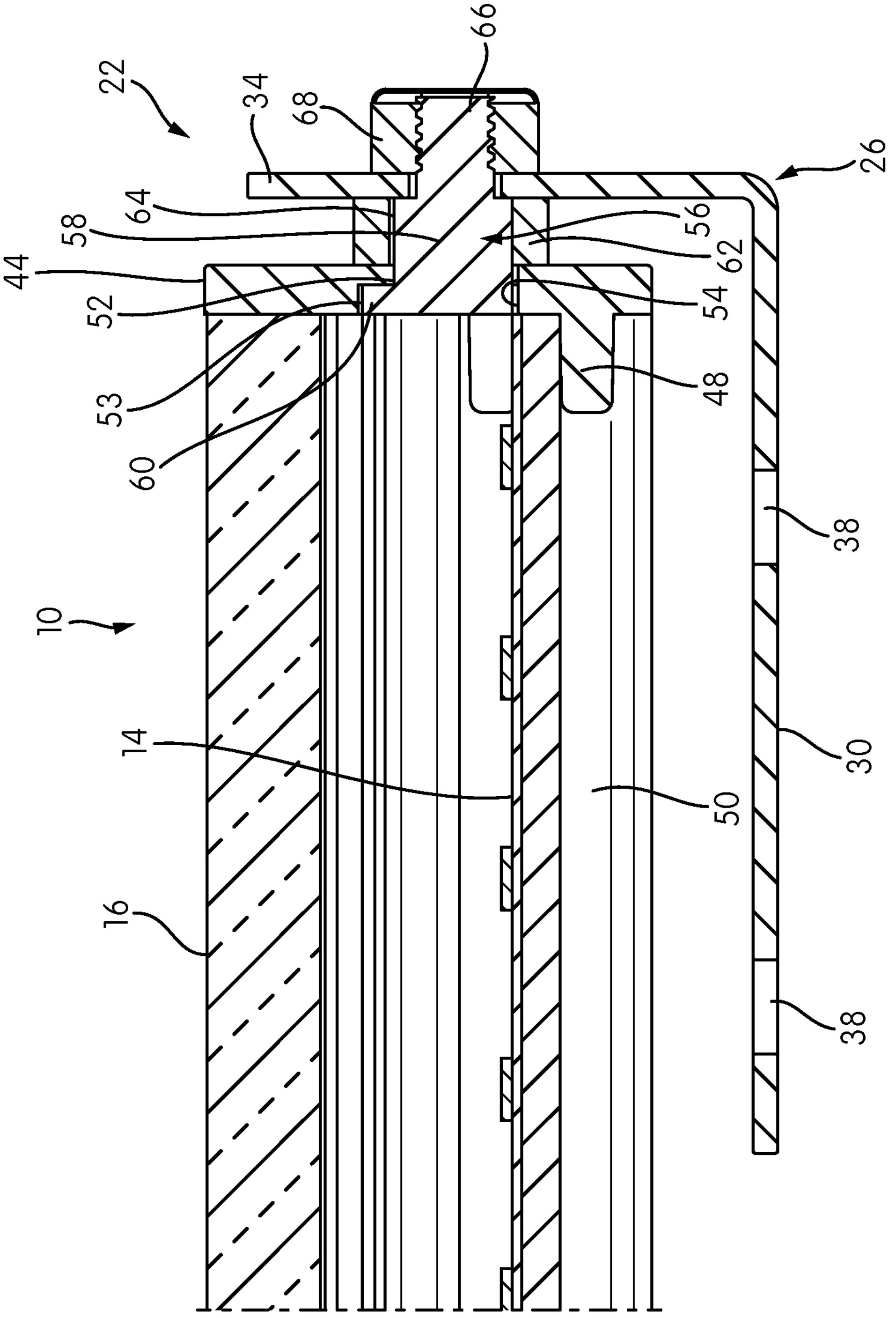
FIG. 4 is a cross-section taken through Line 4-4 of FIG. 1.

FIG. 4 is an exploded perspective view of one end of the linear luminaire 10, illustrating the details of one of the rotating bracket assemblies 22. Many mounting structures and assemblies for linear lighting and linear luminaires use structures that are entirely external to the channel 12. By contrast, the rotating bracket assemblies 22, 24 of the linear luminaire 10 use a combination of internal and external structure.

Specifically, an endcap 44 closes the end 46 of the channel 12. There are many ways in which an endcap 44 might fit on, over, or into a channel 12 to close its end 46, and the precise manner of engagement is not critical. In the illustrated embodiment, a tab 48 extends outward from the inner face of the endcap 44 in the longitudinal direction of the linear luminaire 10. The tab 48 of the endcap 44 inserts into the T-slot 50 in the lower portion of the channel 12 to engage with the channel 12.

The endcap 44 defines a keyed or position-specific opening 52. In this case, the opening has an arched perimeter with a flat side 54. A bolt 56 with a complementarily-keyed shank 58 inserts into the opening 52. The endcap 44 has a recess 53 around the opening 52 in the illustrated embodiment (best seen in FIG. 5), and the head 60 of the bolt 56 is structured to fit into that recess, such that the interior surface of the endcap 44 with the bolt 56 is generally flat, making it less likely to cause shadows when the linear luminaire 10 is illuminated. A bushing 62 with a keyed opening 64 that is in the same shape as the opening 52 of the endcap 44 is interposed between the outer face of the endcap 44 and the upright 34 of the bracket 26. The opening 64 in the bushing 62 receives a portion of the keyed shank 58 of the bolt 56, such that the threaded end 66 of the bolt 56 extends through the opening 64, through the slot 42 in the upright 34, and to the outer side of the upright 34. On the outer side of the upright 34, the threaded end 66 of the bolt 56 is received in a nut 68.

Figure 5:
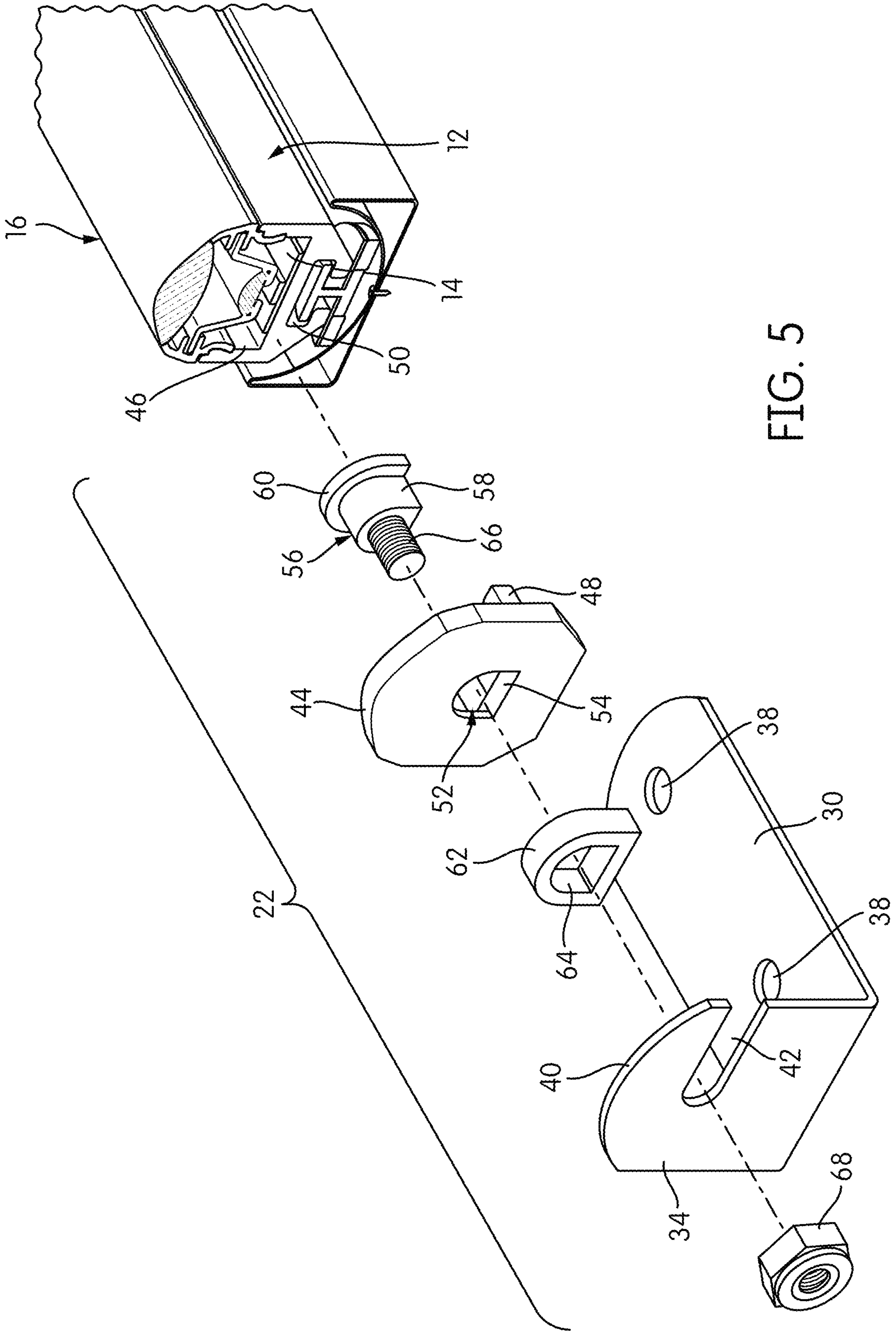
FIG. 5 is an exploded perspective view of one end of the linear luminaire of FIG. 1, illustrating the components of the rotating bracket.

FIG. 5 is a partial longitudinal cross-section of the linear luminaire 10, illustrating the rotating bracket 22 fully assembled. As was described above, the recess 53 around the opening 52 in the endcap 44 allows the head 60 of the bolt 56 to rest flush with the inner face of the endcap 44.

The particular arrangement shown in these figures is not the only one that may be used in embodiments of the invention. For example, instead of a bolt 56 with a keyed shank 58, a clevis pin with a keyed shaft could be used, secured by a cotter pin or other securing structure in its transverse hole, beyond the upright 34 of the bracket 26.

Figure 6:
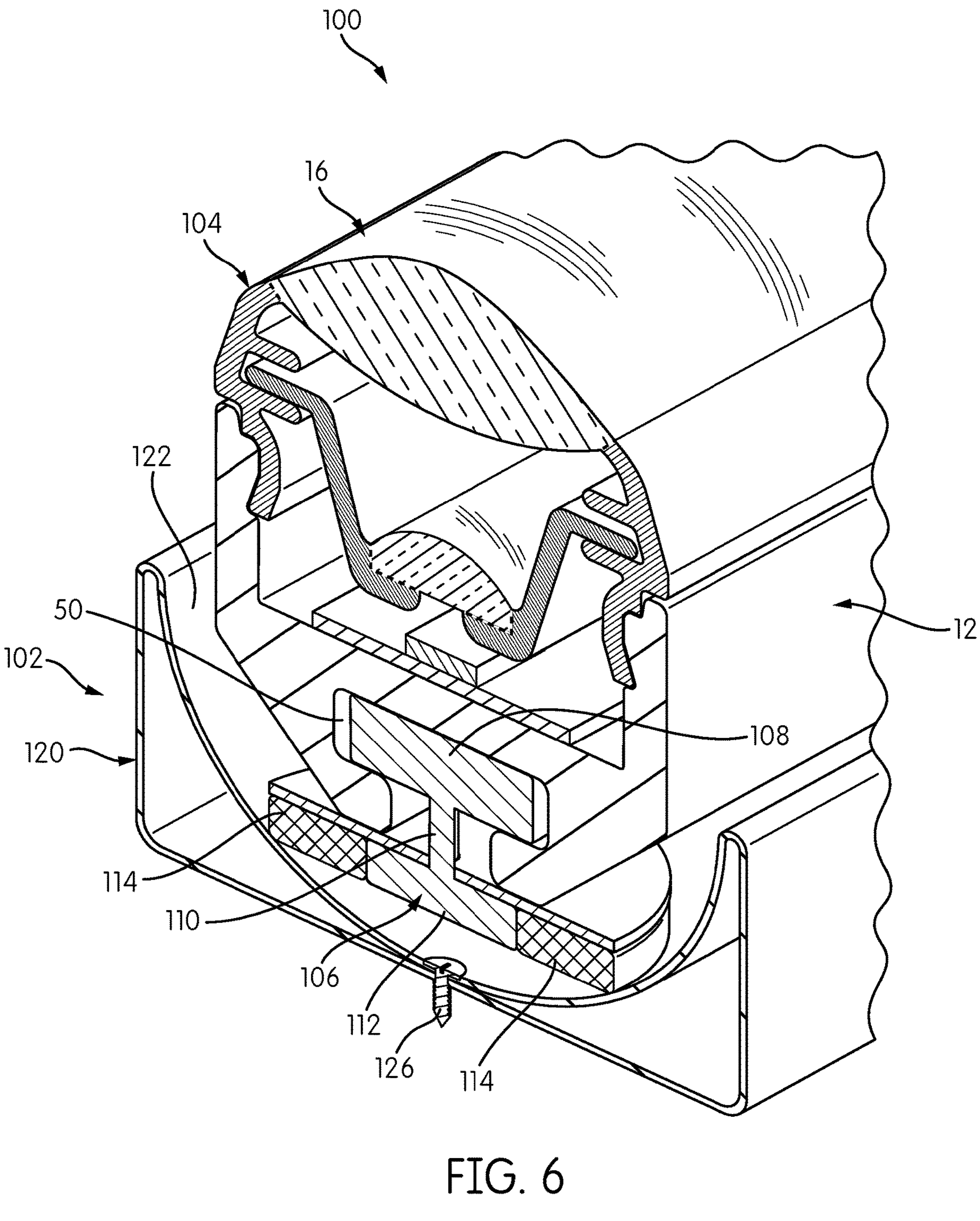
FIG. 6 is an end-sectional perspective view of a linear luminaire mounted on a rotating bracket according to another embodiment of the invention.

FIG. 6 is a perspective view of a portion of a linear luminaire, generally indicated at 100, according to another embodiment of the invention. The linear luminaire 100 also includes a rotating mount, generally indicated at 102. Where the linear luminaire 10 uses bracket assemblies 22, 24 with hardware, the rotating mount 102 relies on ferromagnetic attraction to secure the channel 12 and to allow the channel 12 to rotate.

In FIG. 6, the basic structure of the light-emitting assembly 104 is the same: a channel 12 with linear lighting 14 and a cover 16. For convenience in description and illustration, what is shown in FIG. 6 is again the channel and multi-element optical system disclosed in U.S. Pat. No. 10,788,170, although any channel system or light-emitting assembly may be used.

The channel 12 in this embodiment has a T-slot. A bracket 106 has an upper end 108 that fits in and engages the T-slot 50 of the channel 12. For example, the upper end 108 may be press-fit or frictionally fit into the T-slot of the channel 12, secured with hardware like the endcaps 44, or fixed in place by some other means, like soldering, welding, or adhesives.

The bracket 106 has a shape similar to that of an I-beam, with a thin, generally vertical web section 110 and a lower end 112 that extends out generally horizontally. Fixed to the lower end 112 of the bracket 106 are a pair of magnets 114, one magnet 114 at each side of the lower end 112.

The magnets 114 are strong, permanent magnets, such as neodymium magnets that are secured to the bracket 106 with adhesive, fasteners, or any other appropriate means. They are aligned such that the magnetic poles of each magnet 114 face in the same direction. For example, with reference to the coordinate system of FIG. 6, the north poles of the magnets 114 may face up, while the south poles of the magnets 114 may face down.

The linear luminaire 100 also includes a base 120. The base 120 has a curved bearing surface 122, on which the light-emitting assembly 104 with its magnets 114 is placed, and a support surface 124 that supports the linear luminaire 100 on an external surface. The support surface 124 may be fixed to the external surface, and if fixed, a number of techniques may be used, including adhesives, fasteners, frictional fits of the base 120 into millwork grooves, etc. If fasteners are used, they may pass through the bearing surface 122, the support surface 124, or both. In the illustrated embodiment, a fastener 126 passes through the bearing surface 122 and the support surface 124, such that the head of the fastener 126 is flush with the bearing surface 122.

At least the bearing surface 122 of the base 120 is magnetic in some way. Typically, at least the bearing surface 122 would be made of a ferromagnetic material, although in many cases, the entire base 120 would be made of a ferromagnetic material. If the bearing surface 122 is not made of a magnetic material, it may be covered with one, e.g., a magnetic sheet.

Figure 7:
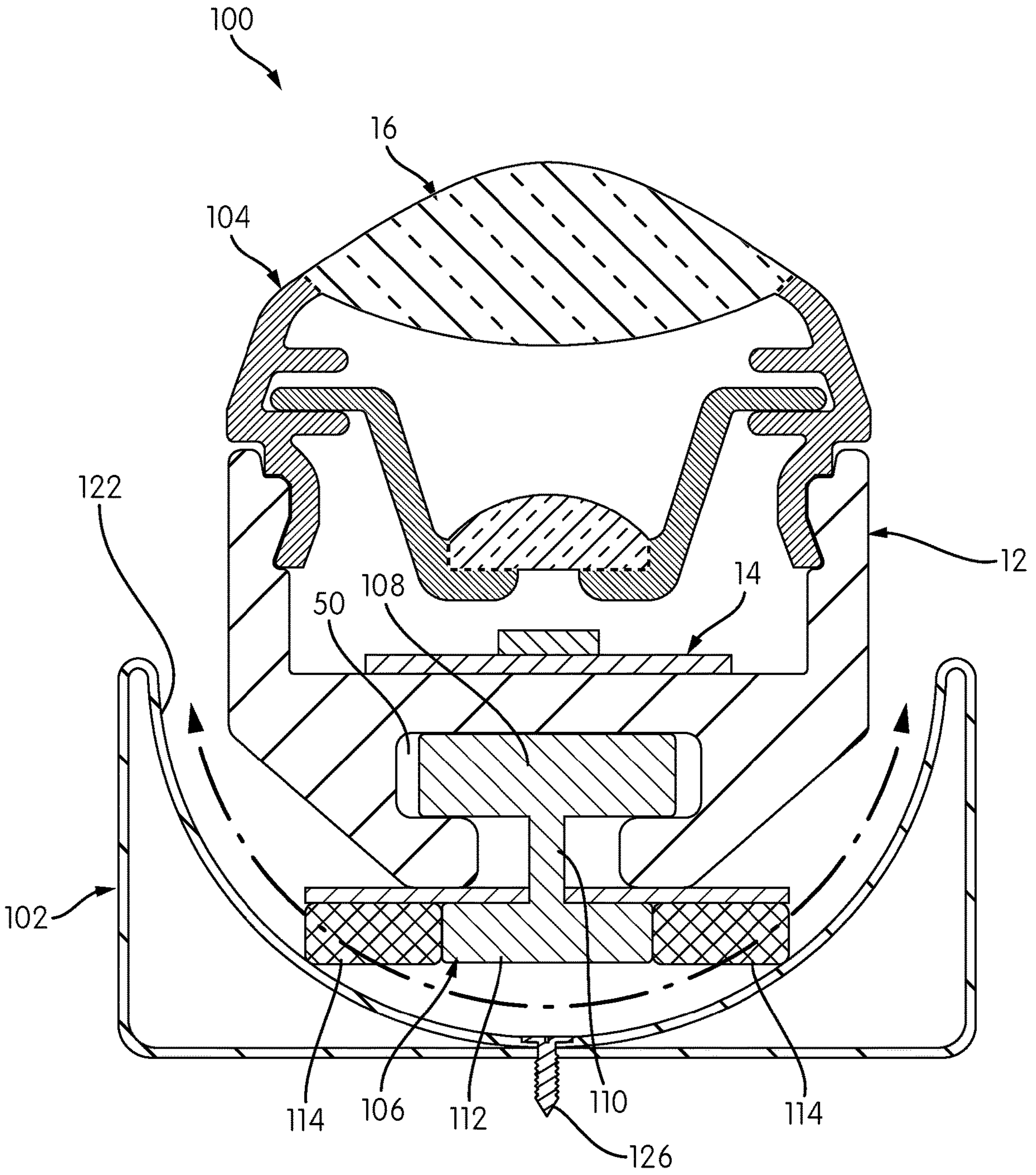
FIG. 7 is an end-elevational view of the linear luminaire of FIG. 6.

As can be seen in the cross-sectional view of FIG. 7, with this configuration, the light-emitting assembly 104 can slide along the bearing surface 122, in the directions of the arrows shown in FIG. 7, essentially pivoting and changing its angle with the contour of the bearing surface 122. The magnets 114 keep the light-emitting assembly 104 magnetically adhered to the base 120 in any position. Given that, the magnetic force should be strong enough to keep the light-emitting assembly 104 on the base 120 while allowing the light-emitting assembly 104 to be changed in position by application of a reasonable amount of force.

In the embodiment of FIGS. 6-7, the bracket 106 contacts the bearing surface 122 directly, and no special structures are provided or efforts taken to ensure that the light-emitting assembly 104 moves smoothly against the bearing surface 122. In many cases, the linear luminaire 100 may be installed, set in position once, and left in that position, so the structure shown in FIGS. 6-7 may be appropriate, insofar as there is unlikely to be enough relative motion between the light-emitting assembly 104 and the bearing surface 122 to cause significant wear.

However, one advantage of the luminaire 100 is that the light-emitting assembly 104 can be repositioned at will. If the luminaire 100 is installed in a position where the light-emitting assembly 104 is likely to be moved often, then the design of the luminaire may accommodate that. For example, the bearing surface 122 could be covered with an appropriate material to smooth movement and resist wear, like high-density polyethylene (HDPE), poly(tetrafluoroethylene) (PTFE), polyoxymethylene (POM; acetal), etc. The lower portion of the channel 12 and the bracket 106 could also be covered by a fairing, and that fairing may have a complementary (e.g., curved) shape to that of the bearing surface. A fairing may also be used to attenuate the magnetic force if the magnets 114 are so naturally strong that the light-emitting assembly 104 can be moved with an appropriate amount of force.

The bracket 106 may extend along the entire T-slot 50 in the channel 12, or several shorter brackets 106 may be used. This will depend on the mass of the light-emitting assembly 104 and the strength of the magnets 114, among other factors.

As those of skill in the art will recognize, one function of the bracket 106 is to place the magnets 114 in close-enough proximity to the bearing surface 122 for the magnetic force from the magnets 114 to engage the light-emitting assembly 104 with the bearing surface 122. Thus, the characteristics and proportions of the bracket 106 will vary from embodiment to embodiment.

Figure 8:
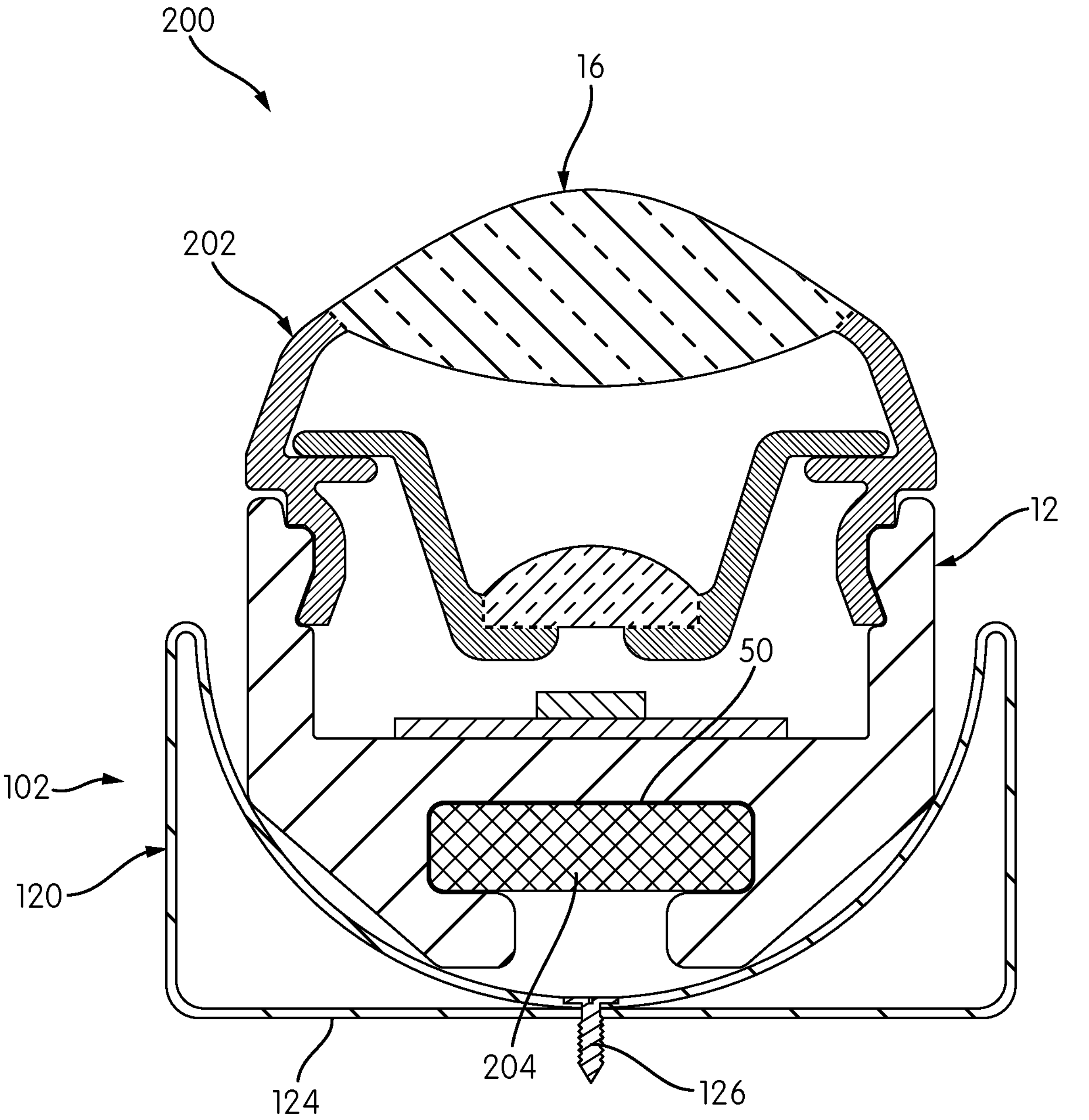
FIG. 8 is an end-elevational view of a linear luminaire on a rotating bracket according to yet another embodiment of the invention.

In some cases, no bracket 106 may be necessary at all. FIG. 8 is a cross-sectional view similar to the view of FIG. 7, illustrating a linear luminaire 200 according to another embodiment of the invention. The linear luminaire 200 is substantially similar to the linear luminaire 100 of FIGS. 6-7, and in particular, the base 120 is the same. However, the light-emitting assembly 202 is different. More specifically, the light-emitting assembly 202 does not include a bracket 106. Instead, a magnet 204 in bar form is installed within the T-slot 50 of the channel 12.

The channel 12 used in FIGS. 1-8 conveniently includes a slot into which a bracket 106 or magnet 204 may be inserted. However, other types of channels may be used. If the channel does not have a slot or its equivalent, magnets, or a bracket or fairing that includes magnets, may be secured to the channel in any number of ways, e.g., by fasteners, adhesives, etc.

The inclusion of permanent magnets, as in the embodiments of FIGS. 6-8, assumes that the channel 12 itself is not ferromagnetic. Many channels 12 used for linear lighting are made of non-ferromagnetic metals, like aluminum. If a channel 12 is made of a ferromagnetic material, like iron, steel, or nickel, or is coated with a ferromagnetic or magnetic material, then it may not be necessary to include a separate permanent magnet; the channel 12 itself can simply be magnetized. However, the fact that a particular channel 12 may be magnetic or magnetizable does not preclude the use of additional permanent magnets—it may be that the channel 12 acts as only a weak magnet, and more magnetic force, or more localized magnetic force, is useful.

While the invention has been described with respect to certain embodiments, the description is intended to be exemplary, rather than limiting. Modifications and changes may be made within the scope of the invention, which is defined by the appended claims.

What is claimed is:

1. A rotating bracket, comprising:

an endcap adapted to fit an end of a linear lighting channel, the endcap having a keyed opening;

a fastener having a keyed shank complementary to the keyed opening of the endcap, the fastener adapted to be inserted into the endcap with the keyed shank of the fastener engaging the keyed opening of the endcap;

a support with a slot or opening, the slot or opening adapted to accommodate the fastener;

a spacer adapted to insert over the fastener such that it is positioned between the endcap and an inner face of the support; and a securement structure engaging an end of the fastener beyond an outer face of the support.

2. The rotating bracket of claim 1, wherein the fastener includes a head, the keyed shank, and a shaft beyond the shank.

3. The rotating bracket of claim 2, wherein the fastener is inserted such that the head of the fastener bears against an inner face of the endcap.

4. The rotating bracket of claim 3, wherein the inner face of the endcap defines a recess into which the head of the fastener fits.

5. The rotating bracket of claim 1, wherein the spacer includes a keyed opening that inserts over the fastener.

6. The rotating bracket of claim 5, wherein the keyed opening of the spacer engages the keyed shank of the fastener.

7. The rotating bracket of claim 1, wherein the fastener comprises a bolt.

8. The rotating bracket of claim 7, wherein the securement structure comprises a nut.

9. A linear luminaire, comprising:

a channel; and at least one strip of linear lighting in the channel;

wherein, at each end thereof, the linear luminaire includes:

an endcap adapted to fit an end of the channel, the endcap having a keyed opening;

a fastener having a keyed shank complementary to the keyed opening of the endcap, the fastener adapted to be inserted into the endcap with the keyed shank engaging the keyed opening;

a support with a slot or opening, the slot or opening adapted to accommodate the fastener;

a spacer adapted to insert over the fastener such that it is positioned between the endcap and an inner face of the support; and securement structure engaging an end of the fastener beyond an outer face of the support.

10. The linear luminaire of claim 9, further comprising a cover shaped and adapted to cover the channel.

11. The linear luminaire of claim 10, wherein the cover comprises a lens.

12. The linear luminaire of claim 9, wherein the fastener includes a head, the keyed shank, and a shaft beyond the shank.

13. The linear luminaire of claim 12, wherein the fastener is inserted such that the head of the fastener bears against an inner face of the endcap.

14. The linear luminaire of claim 13, wherein the inner face of the endcap defines a recess into which the head of the fastener fits.

15. The linear luminaire of claim 9, wherein the fastener comprises a bolt.

16. The linear luminaire of claim 15, wherein the securement structure comprises a nut.

* * * * *